US010289384B2

(12) United States Patent
Zaidi et al.

(10) Patent No.: US 10,289,384 B2
(45) Date of Patent: May 14, 2019

(54) METHODS, SYSTEMS, AND COMPUTER READABLE MEDIA FOR PROCESSING DATA CONTAINING TYPE-LENGTH-VALUE (TLV) ELEMENTS

(71) Applicant: Oracle International Corporation, Redwood Shores, CA (US)

(72) Inventors: Syed Mohsin Reza Zaidi, Cary, NC (US); Lalit Grover, Haryana (IN)

(73) Assignee: Oracle International Corporation, Redwood Shores, CA (US)

( * ) Notice: Subject to any disclaimer, the term of this patent is extended or adjusted under 35 U.S.C. 154(b) by 303 days.

(21) Appl. No.: 14/485,147

(22) Filed: Sep. 12, 2014

(65) Prior Publication Data

US 2016/0077800 A1  Mar. 17, 2016

(51) Int. Cl.
*G06F 7/00* (2006.01)
*G06F 17/30* (2006.01)
*G06F 7/24* (2006.01)
*H04L 12/413* (2006.01)

(52) U.S. Cl.
CPC ............... *G06F 7/24* (2013.01); *H04L 12/413* (2013.01); *Y02B 60/43* (2013.01); *Y02D 30/30* (2018.01)

(58) Field of Classification Search
CPC ......... G06F 7/24; H04L 12/413; Y02D 30/30; Y02B 60/43
USPC ....................................................... 707/741
See application file for complete search history.

(56) References Cited

U.S. PATENT DOCUMENTS

| 7,924,730 | B1 * | 4/2011 | McAllister .......... H04L 43/0811 370/248 |
| 8,005,087 | B2 | 8/2011 | Dolganow et al. |
| 8,369,334 | B2 | 2/2013 | Yu |
| 8,514,871 | B2 | 8/2013 | Anschutz et al. |
| 8,756,337 | B1 | 6/2014 | Canion et al. |
| 9,037,729 | B2 | 5/2015 | Larkin |

(Continued)

FOREIGN PATENT DOCUMENTS

| WO | WO 00/36793 | 6/2000 |
| WO | WO 2018/182843 A1 | 10/2018 |

OTHER PUBLICATIONS

Fajardo et al., "Diameter Base Protocol," RFC 6733, pp. 1-152 (Oct. 2012).

(Continued)

*Primary Examiner* — Tuan A Pham
*Assistant Examiner* — Thai V Dang
(74) *Attorney, Agent, or Firm* — Jenkins, Wilson, Taylor & Hunt, P.A.

(57) ABSTRACT

Methods, systems, and computer readable media for processing messages containing type-length-value (TLV) elements are disclosed. According to one exemplary method for processing a message containing TLV elements, the method includes receiving an ingress message containing a plurality of TLV elements. The method also includes decoding a TLV element from the plurality of TLV elements. The method further includes storing an entry containing information about the TLV element in a multi-view data structure implemented using a memory, wherein the multi-view data structure includes an associative container and at least one linked list data structure for ordering the entry with regard to other entries in the multi-view data structure.

16 Claims, 5 Drawing Sheets

(56) References Cited

U.S. PATENT DOCUMENTS

| | | | |
|---|---|---|---|
| 9,602,405 B1 | 3/2017 | Sharma et al. | |
| 9,639,714 B1 | 5/2017 | Carlson et al. | |
| 9,819,719 B2 | 11/2017 | Hasson et al. | |
| 2002/0109879 A1 | 8/2002 | Wing So | |
| 2005/0182843 A1* | 8/2005 | Reistad | H04L 41/0233 709/230 |
| 2005/0242973 A1 | 11/2005 | Liebl et al. | |
| 2006/0129650 A1* | 6/2006 | Ho | H04L 67/2804 709/207 |
| 2009/0044231 A1 | 2/2009 | Oh et al. | |
| 2010/0158009 A1 | 6/2010 | Lee et al. | |
| 2011/0228794 A1* | 9/2011 | Yong | H04L 1/1809 370/412 |
| 2012/0191847 A1* | 7/2012 | Nas | H04L 63/0227 709/224 |
| 2012/0236734 A1* | 9/2012 | Sampath | H04L 12/413 370/252 |
| 2012/0327779 A1 | 12/2012 | Gell et al. | |
| 2015/0043350 A1 | 2/2015 | Basilier | |
| 2015/0201045 A1 | 7/2015 | Komirelly et al. | |
| 2015/0310087 A1 | 10/2015 | Tidwell et al. | |
| 2015/0319095 A1 | 11/2015 | Stanwood et al. | |
| 2016/0014142 A1 | 1/2016 | Wang et al. | |
| 2016/0094418 A1 | 3/2016 | Raney et al. | |
| 2016/0371143 A1* | 12/2016 | Resch | H04L 63/0457 |
| 2017/0126569 A1 | 5/2017 | Seed et al. | |
| 2017/0220655 A1 | 8/2017 | Henrichs et al. | |
| 2017/0244628 A1 | 8/2017 | Chen | |
| 2018/0077057 A1 | 3/2018 | Zaidi et al. | |
| 2018/0288127 A1 | 10/2018 | Zaidi et al. | |

OTHER PUBLICATIONS

Donovan, "Diameter Routing Message Priority," RFC 7944, pp. 1-8 (Aug. 2016).

Commonly-assigned, co-pending U.S. Appl. No. 15/473,519 for "Methods, Systems, and Computer Readable Media for Providing Message Encode/Decode as a Service," (Unpublished, filed Mar. 29, 2017).

Commonly-assigned, co-pending U.S. Appl. No. 15/267,997 for "Methods, Systems, and Computer Readable Media for Processing Messages Using Stateful and Stateless Decode Strategies," (Unpublished, filed Sep. 16, 2016).

Donovan, "Diameter Routing Message Priority," RFC 7944, pp. 1-18 (Aug. 2016).

Jamil et al., "Malicious Code Detection using Deep Packet Inspection," Riphah Institute of System Engineering (RISE) Islamabad, Pakistan, http://www.academia.edu/8054586/Malicious_Code_Detection_using_Deep_Packet_Inspection?auto=download, p. 1-8 (at least as early as Jul. 2016).

Notification of Transmittal of the International Search Report and the Written Opinion of the International Searching Authority, or the Declaration for International Application No. PCT/US2018/016042 (dated Apr. 30, 2018).

Non-Final Office Action for U.S. Appl. No. 15/267,997 (dated Apr. 18, 2018).

Li et al., "Cloud Transcoder: Bridging the Format and Resolution Gap between Internet Videos and Mobile Devices," NOSSDAV' 12, pp. 33-38 (dated Jun. 7-8, 2012).

Non-Final Office Action for U.S. Appl. No. 15/473,519 (dated Sep. 7, 2018).

Commonly-assigned, co-pending International Patent Application Serial No. PCT/US18/16042 for "Methods, Systems, and Computer Readable Media for Providing Message Encode/Decode as a Service," (Unpublished, filed Jan. 30, 2018).

Notice of Allowance and Fee(s) Due for U.S. Appl. No. 15/267,997 (dated Sep. 18, 2018).

Applicant-Initiated Interview Summary for U.S. Appl. No. 15/473,519 (dated Nov. 20, 2018).

* cited by examiner

FIG. 5

METHODS, SYSTEMS, AND COMPUTER READABLE MEDIA FOR PROCESSING DATA CONTAINING TYPE-LENGTH-VALUE (TLV) ELEMENTS

TECHNICAL FIELD

The subject matter described herein relates to processing communications. More specifically, the subject matter relates to methods, systems, and computer readable media for processing messages containing type-length-value (TLV) elements.

BACKGROUND

Type-length-value (TLV) elements, also known as attribute-value pair or information elements (IEs), are data constructs usable for providing information (e.g., attributes) in protocol packets or other messages. For example, a TLV element may include an identifier indicating a type or kind of information contained therein, a length of the information contained therein, and the value or information contained therein. Various communications protocols and/or data representation schemes (e.g., extensible markup language (XML)) may use TLV elements for exchanging and/or storing information. For example, Diameter and remote authentication dial in user service (RADIUS) are authentication, authorization, and accounting (AAA) protocols and use TLV elements to provide information in various messages.

Some message processing nodes may be configured to process (e.g., encode, decode, and/or other actions) messages containing TLV elements. For example, a Diameter signaling router may be configured to decode an ingress message containing TLV elements, modify the TLV elements, add TLV elements, remove TLV elements, encode an egress message containing the modified TLV elements and/or the additional TLV elements, and send the egress message to a destination. Accordingly, the performance of a message processing node may be dependent on the performance of decode and/or encode operations used for messages containing TLV elements. Existing solutions often have to use multiple data structures with duplicated information and/or circular cross references, or a single data structure with no duplication of information but with computational inefficiencies. As such, these solutions are generally resource inefficient (e.g., requiring more memory and/or processing resources) and/or error prone (e.g., requiring more maintenance).

Accordingly, a need exists for improved methods, systems, and computer readable media for processing messages containing TLV elements.

SUMMARY

Methods, systems, and computer readable media for processing messages containing type-length-value (TLV) elements are disclosed. According to one exemplary method for processing a message containing TLV elements, the method includes receiving an ingress message containing a plurality of TLV elements. The method also includes decoding a TLV element from the plurality of TLV elements. The method further includes storing an entry containing information about the TLV element in a multi-view data structure implemented using a memory, wherein the multi-view data structure includes an associative container and at least one linked list data structure for ordering the entry with regard to other entries in the multi-view data structure.

According to one exemplary system, the system includes at least one processor and a memory. The system also includes a message processing module (MPM) implemented using the at least one processor. The MPM is configured to receive an ingress message containing a plurality of TLV elements, to decode a TLV element from the plurality of TLV elements, and to store an entry containing information about the TLV element in a multi-view data structure implemented using the memory, wherein the multi-view data structure includes an associative container and at least one linked list data structure for ordering the entry with regard to other entries in the multi-view data structure.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the term "TLV element" refers to any information element (IE), attribute value pair (AVP), or other data construct usable for providing information in a communication protocol packet or message.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for processing messages with type-length-value (TLV) elements, e.g., information elements (IEs) and/or attribute value pairs (AVPs). When processing messages with TLV elements, data structures may be needed that allow for fast decoding based on TLV element attributes and also allow for sequential access to TLV elements based on their order in the packet for in-sequence encode (e.g., mandated by some protocols).

In accordance with some aspects of the subject matter described herein, a computing platform (e.g., a testing platform, a device, or a node) or a module (e.g., a field-programmable gateway array (FPGA), an application-specific integrated circuit (ASIC), or software executing on a processor) may be configured to provide constant-time lookups of TLV elements based on TLV attributes. For example, a TLV instance container (e.g., an array, a vector, or other data structure) may store information about TLV elements (e.g., TLV elements "A1", A2", and "A3") associated with a particular TLV element type (e.g., a TLV element tag "A") and the elements in the TLV instance container may be indexed based on the elements' relative positions (e.g., to each other) in a related message (e.g., protocol packet). In this example, multiple TLV instance containers may be stored in an associative container (e.g., a hash-based map, an associative array, or other associative container) and the TLV instance containers in the associative container may be indexed using hash values corresponding to related tags.

In accordance with some aspects of the subject matter described herein, a computing platform or module may be configured to provide sequential access of TLV elements (e.g., protocol related IEs). For example, one or more data structures (e.g., linked lists) may order or group TLV elements based on one or more criteria. In this example, each data structure may also utilize TLV instance containers or other information stored in an associative container such that each TLV instance container element may also act as a data structure (e.g., linked list) element. In other words, a linked list data structure may be overlaid on to an associative container or elements therein, thereby avoiding duplication of information and performance degradation.

In accordance with some aspects of the subject matter described herein, a computing platform or module may be configured to provide support for multi-level nesting of TLV elements. For example, if a TLV element of type "X" (e.g., a TLV element "X1") and a TLV element of type "Y" (e.g., a TLV element "Y1") are both embedded in a TLV element of type "Z" (e.g., a TLV element "Z1"), an associative container (e.g., a hash map) may be used for storing information about TLV element "Z1". In this example, the associative container may include TLV instance containers (e.g., a vector for storing TLV elements of type "X" and a vector for storing TLV elements of type "Y") and a linked list indicating the order of TLV elements of types "X and "Y" in TLV element "Z1". By using associative containers and/or other data structures for nested TLV elements, encoding and/or decoding operations can maintain performance benefits, e.g., regardless of nesting or level complexity.

In accordance with some aspects of the subject matter described herein, a computing platform or module may be configured to provide optimized (e.g., need-based or lazy) decoding of TLV elements from ingress messages (e.g., protocol packets). For example, an optimized decoding may include "walking" through (e.g., inspecting bytes at different locations of) a packet and comparing attributes (e.g., TLV element tags) without performing any extra operations for non-matching TLV elements. In this example, the optimized decoding may include "walking" only as far as necessary to obtain information about a requested TLV element.

In accordance with some aspects of the subject matter described herein, a computing platform or module may be configured to provide optimized encoding of TLV elements into egress messages (e.g., protocol packets). For example, information about various TLV elements for a processed message may be stored, including TLV element size or length, and position of TLV element in the ingress message. Using a stored position of a TLV element in an ingress packet (e.g., an ingress offset value) may allow for optimized encoding of an egress packet by copying non-modified TLV elements directly from the ingress packet, thereby avoiding extra operations. In another example, a position of a TLV element in an egress packet (e.g., an egress offset value) may be stored and used for copying modified/added TLV elements from a previously encoded egress packet to a new egress packet, e.g., if such TLV elements have not been modified since the last encode.

Advantageously, aspects of the subject matter described herein can provide a significant improvement in decode and/or encode operations for processing nodes as compared to legacy implementations that use duplicated data stored in multiple data structures. For example, increases in performance of decode and/or encode operations can allow a Diameter signaling router in accordance with some aspects of the subject matter described herein to relay more Diameter messages per second, with the gain in performance getting better the larger the average message size gets. Further, metadata (e.g., offset values and/or TLV element attribute information) required to be stored by processing nodes in accordance with some aspects of the subject matter described herein may be significantly less than that required by legacy implementations. These advantages can allow operators to get more out of existing hardware, thus providing a better return on investment. These advantages can also enable more efficient virtualized deployments, e.g., which can benefit significantly because of their inherently limited processing and/or memory capacities.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
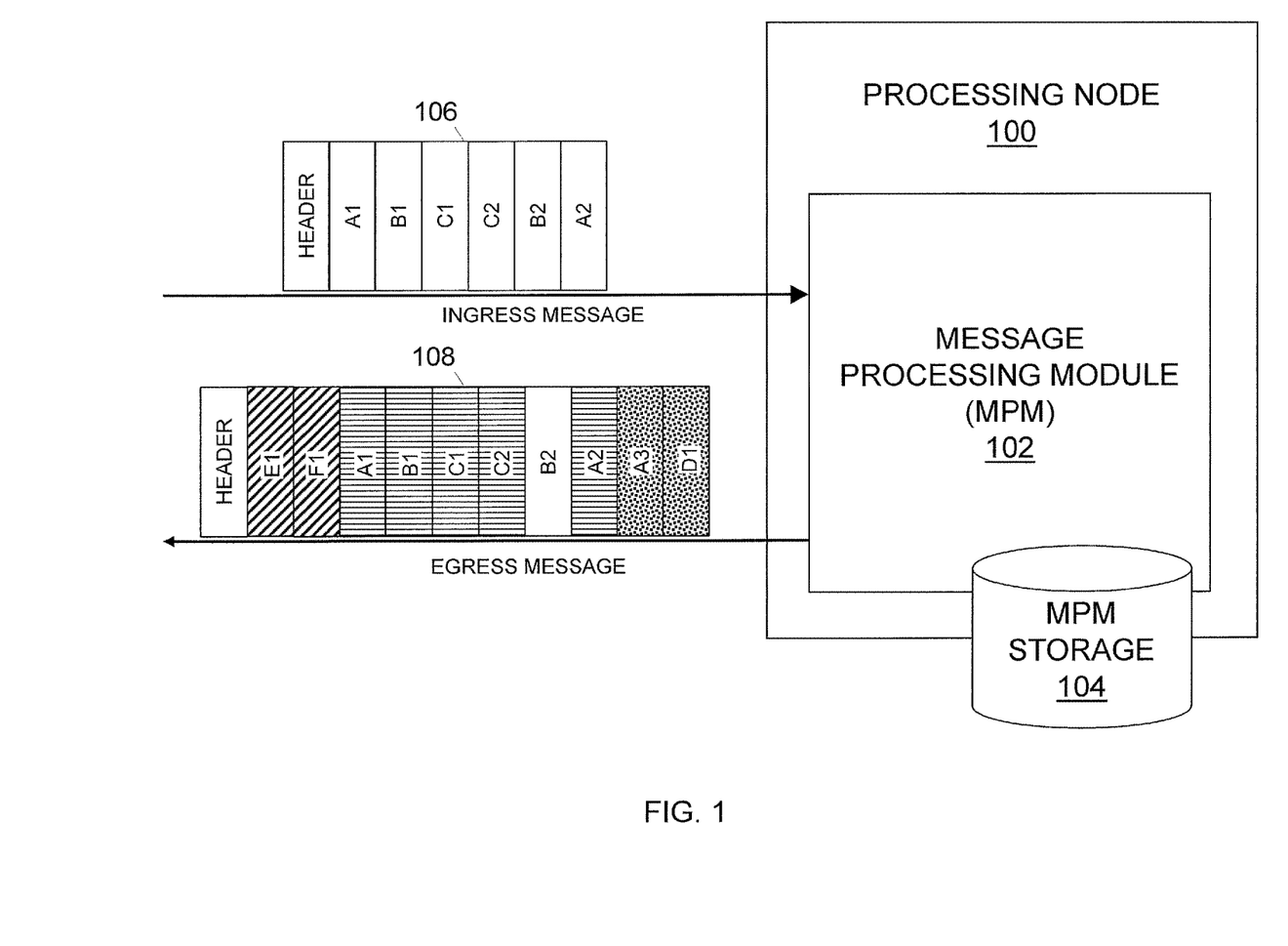
FIG. 1 is a diagram illustrating an exemplary processing node according to an embodiment of the subject matter described herein.

FIG. 1 is a diagram illustrating an exemplary processing node (PN) 100 according to an embodiment of the subject matter described herein. Referring to FIG. 1, PN 100 may include a message processing module (MPM) 102 and an MPM storage 104. PN 100 may represent any suitable entity or entities (e.g., one or more computing platforms, a computing device, and/or software executing on a processor) for performing one or more aspects associated with processing (e.g., encoding and/or decoding) messages containing one or more TLV elements. For example, PN 100 may be configured to receive, process, and/or send messages containing one or more TLV elements. Exemplary PN 100 may include, but is not limited to, a computing platform, a signaling router, a routing agent, a relay agent, a forwarding agent, a Diameter signaling router (DSR), a Diameter node, a remote authentication dial in user service (RADIUS) node, a RADIUS signaling router, a network router, a network switch, a virtualized node, a virtualized DSR, a virtualized signaling router, or a network device.

In some embodiments, PN 100 may include functionality for receiving and/or sending messages associated with one or more communications protocols. For example, PN 100 may include various communications interfaces for communicating with nodes using a Diameter protocol, a RADIUS protocol, a common open policy service (COPS) message, a link layer discovery protocol (LLDP), an intermediate system to intermediate system (IS-IS) protocol, and/or other protocols, e.g., that use TLV or TLV like elements.

MPM 102 may represent any suitable entity or entities (e.g., an FPGA, an ASIC, and/or software executing on a processor) for performing one or more aspects associated with processing messages containing one or more TLV elements. For example, MPM 102 may be configured to receive, process, encode, decode, and/or send messages containing one or more TLV elements. Exemplary processing performable by MPM 102 may include identifying TLV elements and/or related attributes, modifying TLV elements and/or related attributes, and/or decoding and/or encoding messages containing TLV elements. For example, MPM 102 may decode certain TLV elements in a received message in response to receiving a request from a user or other entity. MPM 102 may also include functionality for storing information about decoded and/or detected (e.g., inspected) TLV elements. For example, MPM 102 may use stored information about decoded TLV elements in generating or encoding at least some egress messages.

In some embodiments, MPM 102 may include functionality for "walking through" messages containing TLV elements. For example, MPM 102 may use a decode iterator (e.g., a pointer object) that maintains a position (e.g., a byte offset value) for each message being decoded. In this example, MPM 102 may initialize a decode iterator at the beginning of a message and as TLV elements and/or related tags are inspected, MPM 102 may increment the decode iterator such that the decode iterator maintains the most recent position inspected in the message.

In some embodiments, MPM 102 may use multiple decode iterators for a particular message. For example, MPM 102 may use a decode iterator for each TLV element type encountered. Continuing with this example, MPM 102 may use a decode iterator to quickly find a next TLV element of a particular type since MPM 102 can continue "walking through" a message from the last position inspected.

In some embodiments, MPM 102 may include or access MPM storage 104. MPM storage 104 may represent any suitable entity or entities (e.g., non-transitory computer readable media, flash memory, random access memory, and/or a storage device) for storing information related to TLV elements (e.g., TLV element attributes, TLV element type information, TLV element length or size information, TLV element values, ingress offset values and/or egress offset values) and/or related data structures. For example, MPM storage 104 may store one or more data structures for each ingress and/or egress message being processed. In this example, information about decoded or inspected TLV elements may be stored and accessed by MPM 102 when processing requests for TLV element information and/or for encoding egress messages. In some embodiments, MPM storage 104 may be external to and/or or integrated with PN 100 and/or MPM 102.

In some embodiments, MPM 102 may include one or more communications interfaces for interacting with users and/or nodes. For example, MPM 102 may include communications interfaces for receiving and/or sending Diameter messages, RADIUS messages, COPS messages, LLDP messages, IS-IS messages, and/or other messages. In another example, MPM 102 may include a communications interface for communicating with a network operator and/or a network management node. In this example, MPM 102 may receive a processing request from an entity (e.g., via an application programming interface, an encode and/or decode library (EDL) call, or other mechanism) for decoding ingress messages and/or encoding egress messages or performing related operations.

In some embodiments, MPM 102 may be configured to provide constant-time lookups (e.g., lookups that require a similar amount of time and are not affected by the size of a data structure) of TLV elements, e.g., based on TLV attributes. For example, MPM 102 may store information in an associative container (e.g., an associative array, a hash map, or other related data structure) and/or other data structures that provide or allow constant-time lookups. For example, an associative array may include TLV instance containers (e.g., arrays or vectors containing information about TLV elements of a particular type) indexed using hash values corresponding to TLV related tags and/or TLV vendor identifiers (IDs). In this example, assuming no collisions, the lookup in the associative array may include an amount of time needed to perform a single operation and this amount of time may not change significantly regardless of the size of the associative array.

In some embodiments, an associative container element may store a TLV instance container and related information. Exemplary related information that may be stored in an associative container element may include a decode iterator that maintains the last position inspected in the ingress message for a particular TLV element type and/or data for identifying various characteristics about a TLV element or its type, such as a flag for indicating whether an associated TLV element type is a grouped TLV element type.

In some embodiments, TLV instance containers may include indexed data structures, hash-based data structures, sequential data structures, and/or a combination thereof and may be for storing related TLV elements. For example, while some TLV instance containers may be vectors based on the order of TLV elements in an ingress message, other TLV instance containers may include associative arrays and/or nested TLV instance containers organized by different TLV element characteristics (e.g., a map of vectors based on the order of TLV elements in an ingress message and/or a user-specified priority of added TLV elements).

In some embodiments, MPM 102 may be configured to provide sequential access of TLV elements. For example, MPM 102 may store or use one or more data structures (e.g., linked lists) that utilize TLV instance containers or other information stored in an associative array. In this example, MPM 102 may iterate or traverse (e.g., sequentially) through the one or more data structures and may maintain its place or iterator from the last object visited in the data structure. In some embodiments, each TLV instance container element may act as a linked list element, thereby avoiding duplication of information and performance degradation, e.g., due to the management of multiple, dissimilar data structures.

In some embodiments, MPM 102 may be configured to order TLV elements in a data structure (e.g., a linked list and/or a TLV instance container) using positions of the TLV elements in a received message. For example, MPM 102 may order information about TLV elements in a linked list using positions of the TLV elements in an ingress packet with regard to all other TLV elements in the ingress packet. In another example, MPM 102 may order information about TLV elements of a particular type in a TLV instance container using positions of the TLV elements in an ingress packet with regard to all other TLV elements of the same type in the ingress packet.

In some embodiments, MPM 102 may be configured to use or store separate data structures (e.g., linked lists) for certain TLV, e.g., TLV elements that are to be added at particular locations in egress messages. For example, a first linked list may be used for storing information about TLV elements that are to be included near a packet header of an egress message and a second linked list may be used for storing information about TLV elements that are to be included near the end of an egress packet. By using separate data structures to store certain TLV elements (e.g., that need to be placed near a packet header), an in-sequence encode of TLV elements into the egress packet may be performed without additional or unnecessary lookups, e.g., by iterating through the different linked lists in a particular order and copying the relevant TLV elements.

In some embodiments, MPM 102 may be configured to use, access, and/or modify multiple data structures that utilize TLV instance containers, or information stored therein, associated with an associative container. For example, an associative container may store information about TLV elements in TLV instance containers. In this example, linked lists may point to various TLV elements in the TLV instance containers, e.g., each linked list may contain information about TLV elements that are related based on one or more criteria (e.g. TLV element size, optional TLV elements, mandatory TLV elements, primitive TLV elements, grouped TLV elements, etc.). Hence, by using data structures that order or group different information about TLV elements and their types, additional views of the underlying protocol data are maintained.

In some embodiments, MPM 102 may be configured to provide optimized (e.g., need-based or lazy) decoding of TLV elements from ingress messages (e.g., protocol packets). For example, MPM 102 may be configured to "walk" through a packet comparing TLV attributes (e.g., TLV element tags) without performing any extra operations for non-matching TLV elements. In this example, MPM 102 may be configured to "walk" only as far as necessary to obtain information about a requested TLV element.

In some embodiments, MPM 102 may be configured to determine and to store positions (e.g., offset values) of TLV elements in ingress messages (e.g., in one or more data structures). In such embodiments, position information may be usable to permit read-only operations without actually storing values of the TLV elements. By storing position information in lieu of storing values or other attributes of TLV elements, resources and time may be saved (e.g., by avoiding potentially expensive memory related operations in scenarios where the existence or location of a TLV element is requested but not the actual value therein).

In some embodiments, MPM 102 may be configured to provide optimized encoding of TLV elements into egress messages. For example, a stored position (e.g., an ingress offset value) of a TLV element in an ingress packet may allow for optimized encoding of an egress packet by copying non-modified TLV elements directly from the ingress packet, thereby avoiding extra operations. In another example, a position (e.g., an egress offset value) of a TLV element in an egress packet may be stored and used for copying modified/added TLV elements from a previously encoded egress packet, e.g., if such TLV elements have not been modified since the last encode, thereby avoiding extra operations.

In some embodiments, MPM 102 may use an encode iterator (e.g., a pointer object) that maintains a position (e.g., a byte offset value) for each message being encoded. In this example, MPM 102 may initialize a encode iterator at the beginning of a message and as TLV elements are inserted into egress message 108, MPM 102 may increment the encode iterator such that the encode iterator maintains the position for the next TLV element to be inspected in the message. In some embodiments, MPM 102 may use multiple decode iterators for egress message 108.

Ingress message 106 may represent any message (e.g., packet) containing one or more TLV elements that may be received, processed, and/or decoded by MPM 102. For example, ingress message 106 may represent a Diameter message, a RADIUS message, a COPS message, a LLDP message, or an IS-IS message. As depicted in FIG. 1, ingress message 106 may include multiple TLV elements, of the same or different types. For example, each TLV element type may be represented by a letter, such as "A", "B", "C", and/or "D". In this example, each TLV element (e.g., of a particular TLV element type) may be represented by a number after a particular letter, such as "A1", "A2", and "A3".

In some embodiments, MPM 102 may be configured to receive ingress message 106 and/or to perform one or more operations associated with processing TLV elements associated with ingress message 106. For example, MPM 102 may be configured to receive EDL related requests (e.g., a request for determining whether certain TLV elements exists in ingress message 106 and/or for determining values of certain TLV elements in ingress message 106. In response, MPM 102 may be configured to inspect TLV elements (e.g., via associated tags) in ingress message 106 and, if requested TLV elements are found, provide appropriate responses for the EDL related requests.

Egress message 108 may represent any message (e.g., a packet) containing one or more TLV elements and may be generated and/or encoded by MPM 102. For example, egress message 108 may represent a Diameter message, a RADIUS message, a COPS message, a LLDP message, or an IS-IS message. As depicted in FIG. 1, egress message 108 may include multiple TLV elements, of the same or different types. For example, each TLV element type may be represented by a letter, such as "A", "B", "C", and/or "D". In this example, each TLV element may be represented by a number after a particular letter, such as "A1", "A2", and "A3".

In some embodiments, egress message 108 may include TLV elements decoded from ingress message 106. For example, TLV elements "A1", "B1", "C1", "C2", and "A2" may be decoded from ingress message 106 and information about these TLV elements may be stored in MPM storage 104 and may be used when encoding egress message 108.

In some embodiments, egress message 108 may include TLV elements from ingress message 106 that were not decoded and/or modified. For example, TLV element "B2" may be included from ingress message 106. In this example, MPM 102 may be configured to determine that some portions of ingress message 106 may be copied directly into egress message 108.

In some embodiments, egress message 108 may include TLV elements different from or in addition to those in ingress message 106. For example, TLV elements "E1", "F1", "A3", and "D1" may be added and/or modified by MPM 102 and used when encoding egress message 108.

In some embodiments, MPM 102 may be configured to generate and/or encode egress message 108 and/or to perform one or more operations associated with processing TLV elements associated with egress message 108. For example, MPM 102 may be configured to modify a first TLV element associated with a tag "A" (e.g., a TLV element "A1") containing a destination address for ingress message 106, to encode egress message 108 containing the modified TLV element, and to send egress message 108 to an appropriate destination. In this example, MPM 102 may modify, using one or more data structures containing information about various decoded TLV elements in ingress message 106, TLV element "A1" to include a relevant destination address and include the modified TLV element in egress message 108.

It will be appreciated that FIG. 1 is for illustrative purposes and that various data structures and/or functionality described above in relation to FIG. 1 may be changed, altered, added, or removed.

Figure 2:
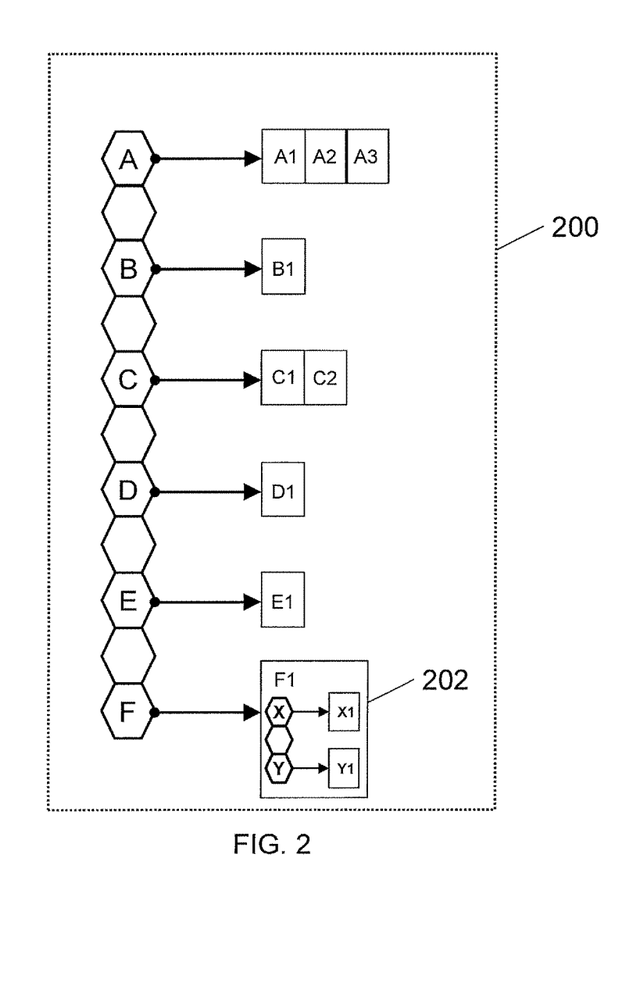
FIG. 2 is a diagram illustrating an exemplary associative container for storing TLV element related information according to an embodiment of the subject matter described herein.

FIG. 2 is a diagram illustrating an exemplary associative container 200 for storing TLV element related information according to an embodiment of the subject matter described herein. Associative container 200 may represent any suitable data structure(s) for storing information about TLV elements and may use keys (e.g., TLV element tags) for indexing. Exemplary data structures for implementing associative container 200 may include a dictionary data structure, a hash map, a symbol table, a key-value data structure, and/or an associative array.

In some embodiments, associative container 200 may be accessed, maintained, and/or modified. For example, if MPM 102 decodes a new TLV element, MPM 102 may determine a relevant TLV instance container using an associated tag and may modify the TLV instance container by adding or inserting the new TLV element into the TLV instance container. In another example, if MPM 102 decodes a new TLV element of a new TLV element type, MPM 102 may generate a new TLV instance container, may generate a new hash value based on an associated tag, and may store the information in associative container 200. In yet another example, if MPM 102 needs to delete, add, or modify content in associative container 200 or another data structure, MPM 102 may locate the relevant content and delete or modify the content, as needed.

In some embodiments, associative container 200 may include a hash map containing hash values associated with information about TLV elements. For example, associative container 200 may include hash values of TLV element tags. In some embodiments, each hash value may be associated with a TLV instance container (e.g., a linked list and/or another associative container 200) for containing information about TLV elements.

Referring to FIG. 2, hash values may be represented as hexagons depicting letters like "A", "B", "C", "D", "E", and "F". Arrows may represent that hash values and TLV instance containers are associated. As depicted in FIG. 2, a TLV instance container may be represented as one or more boxes, where each box may represent information about a TLV element and may be depicted as a letter and a number like "A1", "A2", and "A3".

In some embodiments, a TLV instance container and/or TLV instance container elements therein may include information about a TLV element type and/or related TLV elements. Exemplary information storable in a TLV instance container element may include TLV element attributes (e.g., flags, a tag, and/or parameter values stored in a TLV element), TLV element type information, TLV element length or size information, TLV element values, ingress offset values, egress offset values, and/or other information (e.g., metadata). For example, assuming a TLV element type "F" is associated with a Diameter AVP (e.g., a "Destination-Host" AVP), each TLV element associated with the Diameter AVP may include an AVP code, zero or more AVP flags, an AVP length, an optional vendor identifier, and/or a value therein (e.g., a destination host identifier). In this example, MPM 102 may be configured to store all this information about the Diameter AVP, along with other "metadata" (e.g., offset values associated with message positioning of the TLV element) usable for processing.

In some embodiments, information stored in associative container 200 or other data structure may include offset values usable when encoding and/or generating egress messages. For example, an ingress offset value may indicate the start of a TLV element or attribute therein from a determinable reference point (e.g., the start of an ingress protocol packet). In another example, an egress offset value may indicate the start of a TLV element or attribute therein from a determinable reference point (e.g., the start of a previously generated egress protocol packet). Based on whether the TLV element was modified since it was decoded or last encoded, MPM 102 may determine whether a TLV element in a particular data structure should be copied into egress message 108 or whether another TLV element or other information (e.g., stored in ingress message 106) should be copied into egress message 108 instead.

In some embodiments, associative container 200 may include a nested (e.g., embedded) associative container 202. In such embodiments, associative container 202 may include information about a grouped or nested TLV element. For example, as depicted in FIG. 2, associative container 202 may include information about a TLV element "F1" of a grouped or nested TLV element type "F". In this example, TLV element "F1" may include a hash map containing hash values associated with information about TLV element types "X" and "Y". Continuing with this example, associative container 202 may include a TLV instance container including a TLV element "X1" of type "X", a TLV instance container including a TLV element "Y1" of type "Y", and a linked list indicating the order of TLV elements "X1" and "Y1" in TLV element "F1". By using associative container 202 for a nested TLV element, encoding and/or decoding operations can maintain performance benefits, e.g., regardless of nesting or level complexity.

It will be appreciated that FIG. 2 is for illustrative purposes and that various data structures and/or functionality described above in relation to FIG. 2 may be changed, altered, added, or removed.

Figure 3:
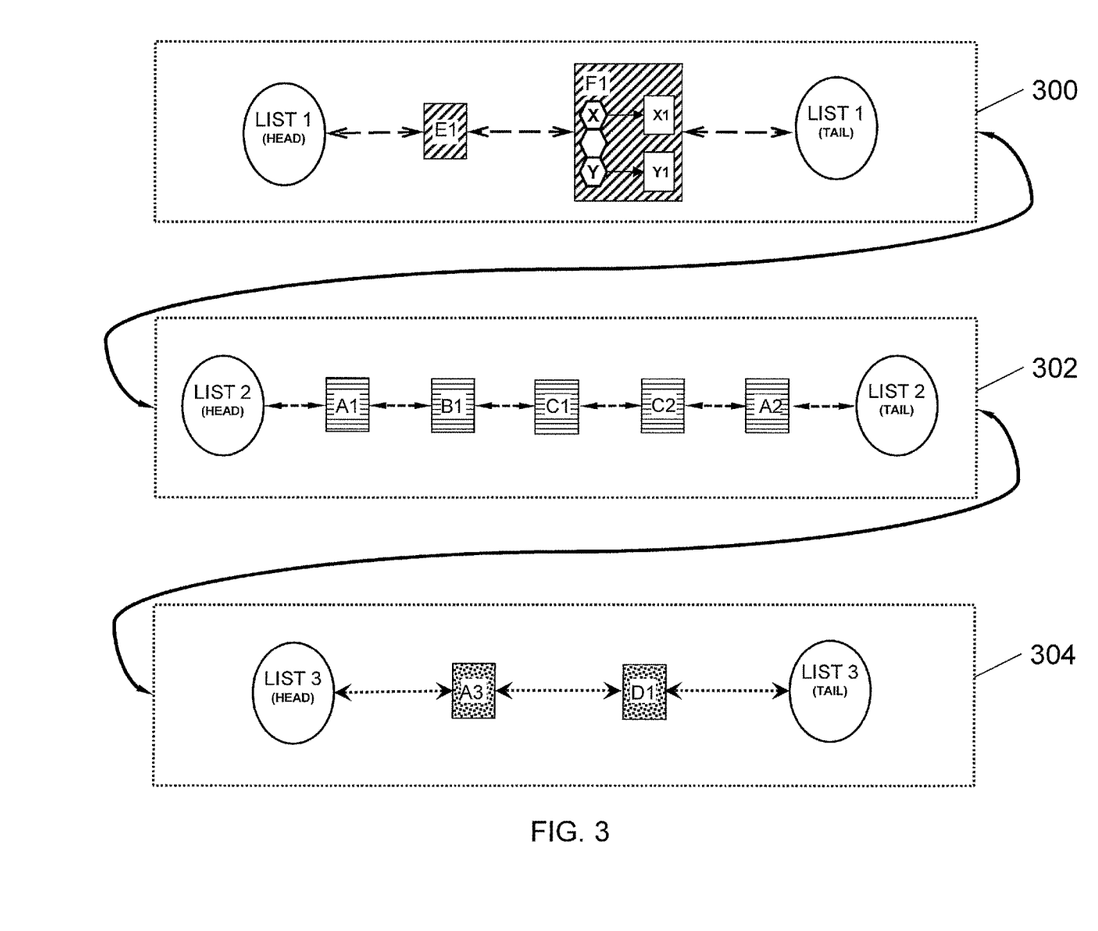
FIG. 3 is a diagram illustrating exemplary linked lists for storing TLV element related information according to an embodiment of the subject matter described herein.

FIG. 3 is a diagram illustrating exemplary linked lists 300-304 for storing TLV element related information according to an embodiment of the subject matter described herein. Referring to FIG. 3, linked lists 300-304 may represent any suitable data structure(s) for storing information about TLV elements and may include references to other entries containing information about TLV elements (e.g., a previous and/or subsequent entry).

In some embodiments, each of linked lists 300-304 may include one or more sentinel or dummy nodes (e.g., a head node and/or a tail node) that act as placeholders for the beginning or end of a linked list. In some embodiments, each of linked lists 300-304 may be parts of a single linked list, delimited by sentinel nodes. In some embodiments, each of linked lists 300-304 may represent a singly linked list, where each node in the singly linked list (except the last node) may reference a next node in the list. In another example, each of linked lists 300-304 may represent a doubly linked list, where each node in the doubly linked list (except the first and last node) may reference a previous node in the list and a next node in the list.

In some embodiments, each of linked lists 300-304 may be accessed, maintained, and/or modified. For example, if MPM 102 decodes a new TLV element, MPM 102 may store information about the TLV element (e.g., in associative container 200 or a TLV instance container) and insert a new entry containing that information into linked list 300. In this example, inserting the entry of linked list may include modifying references associated with other entries, e.g., such that neighboring entries to the new entry refer to or point to the new entry. In another example, if MPM 102 needs to delete, add, or modify content in linked lists 300-304, MPM 102 may locate the relevant content and delete or modify the content and/or references to the content, as needed.

In some embodiments, each of linked lists 300-304 may be used to store different TLV elements and/or different sequences of TLV elements. For example, MPM 102 may use three different linked lists depending on expected placement of TLV elements in egress messages 108. Continuing with this example, MPM 102 may add or insert an entry into linked list 300 when a TLV element is added that is to be included near the start of egress message 108, whereas MPM 102 may add or insert an entry into linked list 304 when a TLV element is added that is to be included near the end of egress message 108, and whereas MPM 102 may add or insert an entry into linked list 302 when a TLV element is inspected and/or decoded from the ingress message 106 and that is to be included somewhere in egress message 108.

In some embodiments, one or more of linked lists 300-304 may be used in conjunction with interleaved encoding. For example, linked list 304 may contain added elements that need to be encoded somewhere between where decoded elements from linked list 302 are encoded. In this example, one or more elements associated with linked list 304 may be inserted into egress message 108 prior to inserting all of the elements associated with linked list 302.

In some embodiments, linked lists 300-304 may be utilized for performing an in-sequence encode of TLV elements into egress message 108. In such embodiments, in-sequence encoding may be performed without additional or unnecessary lookups, e.g., by iterating data structures in a particular order. For example, MPM 102 may be configured to iterate through linked list 300 (e.g., which may include TLV elements that are to be included near the start of egress message 108 as expected by a relevant protocol) and copy TLV elements and/or other information from linked list 300. After iterating through linked list 300, MPM 102 may be configured to iterate through linked list 302 (e.g., which may include TLV elements that are to be included somewhere in egress message 108) and copy TLV elements and/or other information from linked list 302. After iterating through linked list 302, MPM 102 may be configured to iterate through linked list 304 (e.g., which may include TLV elements that are to be included near the end of egress message 108) and copy TLV elements and/or other information from linked list 304.

In some embodiments (e.g., where lazy or need-based decoding occurs such that non-decoded TLV elements from ingress message 106 are not included in linked lists 300-304), prior to copying a TLV element from one of linked lists 300-304 into egress message 108, information associated with a TLV element may be inspected and/or analyzed to determine whether the copying is appropriate. For example, after an TLV element "C2" is encoded in egress message 108, an end offset of TLV element "C2" and a start offset of TLV element "A2" in ingress message 106 (i.e., the original state of TLV element "C2", even if it has been subsequently modified) may be inspected. If there is a gap between these two values, then there are non-decoded TLV elements (e.g., TLV element "B2") between TLV element "C2" and TLV element "A2" that must be copied directly from ingress message 106 to egress message 108 before encoding TLV element "A2".

In some embodiments, each of linked lists 300-304 may be utilized to group and/or order TLV elements based on various criteria (e.g., position of TLV element in a message, TLV element size, and/or whether TLV elements are optional, mandatory, primitive, or grouped, etc.). For example, linked list 300 may order entries based on positions of TLV elements in egress message 108. In another example, linked list 300 may be ordered by TLV element size, e.g., from smallest TLV element (e.g., in bytes) to largest. In yet another example, linked list 300 may include all mandatory TLV elements (e.g., TLV elements that must appear in egress message 108), while linked list 302 may include all optional TLV elements (e.g., TLV elements that may appear in egress message 108). In some embodiments, by using data structures that order or group different information about TLV elements, additional views of the underlying protocol data are maintained, thereby providing performance benefits for various use cases and/or sort criteria. In yet another example, elements added to a particular linked list (e.g., linked lists 300-304) may be ordered within that list based on a user-specified priority.

It will be appreciated that FIG. 3 is for illustrative purposes and that various data structures and/or functionality described above in relation to FIG. 3 may be changed, altered, added, or removed.

Figure 4:
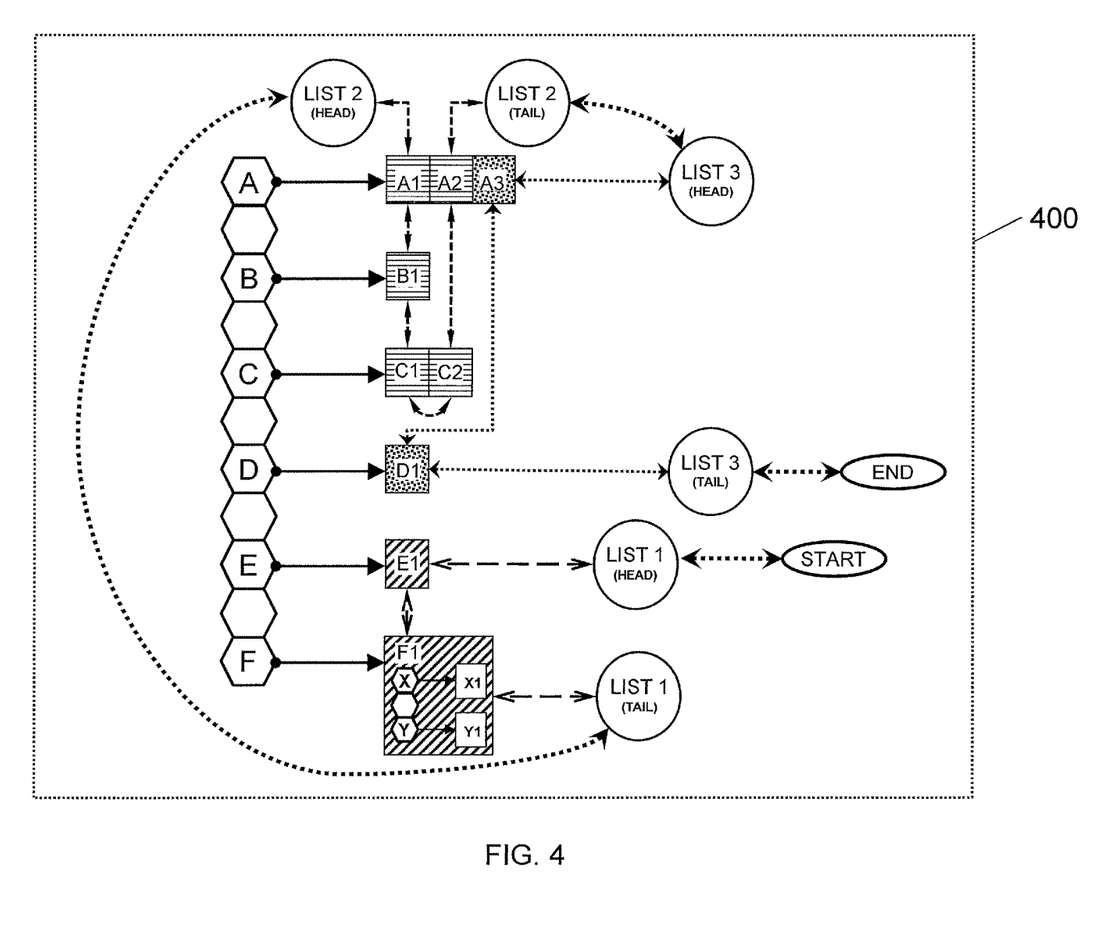
FIG. 4 is a diagram illustrating an exemplary multi-view data structure for storing TLV element related information according to an embodiment of the subject matter described herein.

FIG. 4 is a diagram illustrating an exemplary multi-view data structure 400 for storing TLV element related information according to an embodiment of the subject matter described herein. In some embodiments, multi-view data structures 400 may be used for storing information about each ingress message 106 and/or egress message 108 processed by MPM 102.

Referring to FIG. 4, multi-view data structure 400 may represent any suitable data structure(s) for storing information about TLV elements, may use keys (e.g., TLV element tags) for indexing, and may include linked lists that reference content stored therein. Exemplary data structures for implementing multi-view data structure 400 may include one or more associative containers (e.g., associative containers 200-202), one or more linked lists (e.g., linked lists 300-304), and/or other data structures.

In some embodiments, multi-view data structure 400 can include linked lists 300-304. For example, each of linked lists 300-304 may be "overlaid onto" associative container 200. For example, an overlaid linked list 300 may include (e.g., refer to or point to) information stored in one or more TLV instance containers stored in associative container 200. In some embodiments, linked list 300 may reference memory addresses that are associated with information stored in other data structures of multi-view data structure 400. For example, in lieu of storing duplicate information, each list element in linked list 300 may include memory pointers to information about TLV elements.

Referring to FIG. 4, linked list 300 (e.g., depicted in FIG. 4 as "LIST 1") may reference TLV elements "E1" and "F1"; where each TLV element may be stored in various data structures (e.g., a vector and/or associative container 202) associated with multi-view data structure 400. Linked list 302 (e.g., depicted in FIG. 4 as "LIST 2") may reference TLV elements "A1", "B1", "C1", "C2", and "A2"; where each TLV element may be stored in various data structures associated with multi-view data structure 400. Linked list 304 (e.g., depicted in FIG. 4 as "LIST 3") may reference TLV elements "A3" and "D1"; where each TLV element may be stored in various data structures associated with multi-view data structure 400.

In some embodiments, by using one or more linked lists that references information stored in multi-view data structure 400, duplication of information can be avoided, thereby decreasing memory usage for storing information about TLV elements associated with encode and/or decode operations. Moreover, a multi-view data structure 400 may be usable for efficient in-sequence encoding of egress message 108 as MPM 102 may iterate through one or more linked lists associated with multi-view data structure 400 and copy relevant TLV elements into egress message 108 based on offset values or other information stored in multi-view data structure 400.

In some embodiments, multi-view data structure 400 and/or data structures therein may be utilized for performing an in-sequence encode of TLV elements into egress message 108. In such embodiments, in-sequence encoding may be performed without additional or unnecessary lookups, e.g., by iterating through data structures in a particular order. For example, as depicted in FIG. 4, MPM 104 may encode TLV elements into egress message 108 by starting at the head of linked list 300, moving to and through linked list 302, and then moving to and through linked list 304.

It will be appreciated that FIG. 4 is for illustrative purposes and that various data structures and/or functionality described above in relation to FIG. 4 may be changed, altered, added, or removed.

Figure 5:
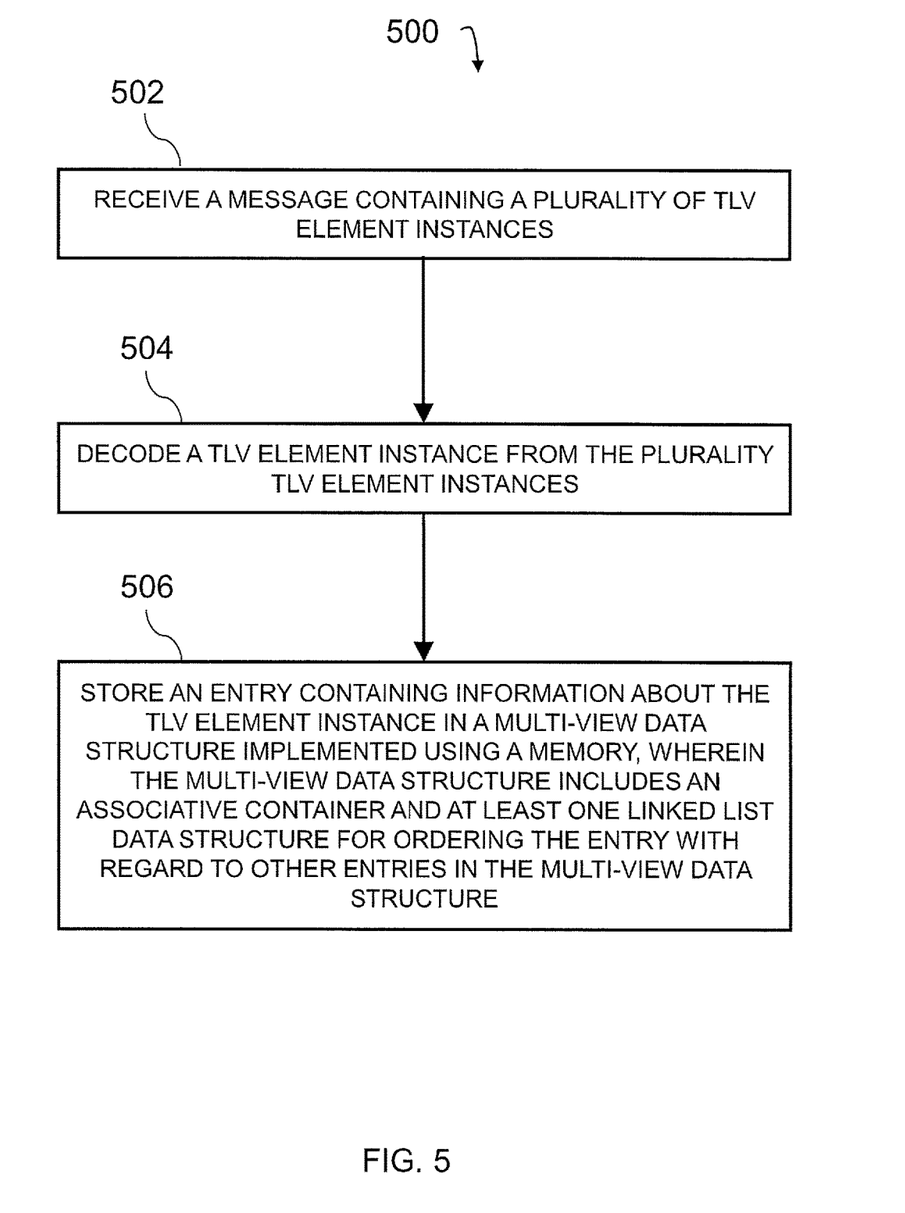
FIG. 5 is a diagram illustrating an exemplary process for processing a message containing TLV elements according to an embodiment of the subject matter described herein.

FIG. 5 is a diagram illustrating an exemplary process 500 for processing a message containing TLV elements according to an embodiment of the subject matter described herein. In some embodiments, exemplary process 500, or portions thereof, may be performed by or at PN 100, MPM 102, and/or another node or module. In some embodiments, exemplary process 500 may include steps 502, 504, 506, and/or 508.

Referring to exemplary process 500, at step 502, ingress message 106 containing a plurality of one or more TLV elements may be received. For example, MPM 102 may receive ingress message 106 from a source node.

In some embodiments, ingress message 106 may include a Diameter message, a RADIUS message, a COPS message, a LLDP message, or an IS-IS message.

At step 504, a TLV element from the plurality of TLV elements may be decoded. For example, after receiving ingress message 106 and a request to find the first TLV element in ingress message 106 associated with a tag 'A', MPM 102 may analyze or "walk through" ingress message 106. In this example, MPM 102 may inspect the tag of each TLV element in ingress message 106 until the relevant tag is found or until all TLV elements have been inspected. If the relevant tag is found, MPM 102 may decode the first TLV element with this tag and store information associated with this element, e.g., at MPM storage 104.

At step 506, an entry containing information about the TLV element may be stored in multi-view data structure 400 implemented using a memory. In some embodiments, multi-view data structure 400 may include at least one linked list data structure for ordering the entry with regard to other entries in the multi-view data structure.

In some embodiments, multi-view data structure 400 may be stored at MPM storage 104 or implemented using other memory.

In some embodiments, multi-view data structure 400 may include a TLV instance container for storing entries containing information about particular TLV elements. In some embodiments, a TLV instance container may be indexed in multi-view data structure 400 using a tag and/or a vendor ID associated with a particular TLV element type.

In some embodiments, a TLV instance container may store entries in an order based on a relative position of each TLV element in ingress message 106. For example, if ingress message has three TLV elements (e.g., "A1", "A2", and "A3") of a TLV element type "A", the three TLV elements may be ordered in the TLV instance container based on their relative position to the start of ingress message 106, e.g., from closest TLV element to farthest away TLV element from the start of ingress message 106.

In some embodiments, at least one linked list data structure may order entries (e.g., of multi-view data structure 400) based on a position of a TLV element in the ingress message with regard to positions of other TLV elements in the ingress message. For example, linked list 302 may represent a number of TLV elements (e.g., "A1", "B1", "C1", "C2", and "A2") in ingress message 106 that are decoded by MPM 102. In this example, the TLV elements in linked list 302 may be ordered based on their position to the start of ingress message 106.

In some embodiments, at least one linked list data structure may include a linked list data structure (e.g., linked list 300) for ordering TLV elements that are to be included near an egress message header, a linked list data structure (e.g., linked list 304) for ordering TLV elements that are to be included near the end of an egress message, a linked list data structure (e.g., linked list 302) for ordering other decoded TLV elements, and/or a linked list data structure for ordering TLV elements that are to be included between decoded TLV elements in an egress message. For example, one linked list may order AVPs that need to be inserted close to a header but after AVPs that have fixed positions right after the start of the header (e.g., a Session-Id AVP).

In some embodiments, MPM 102 or related functionality therein may be configured to encode, using multi-view data structure 400, egress message 108 and to send egress message 108 to a destination.

In some embodiments, MPM 102 or related functionality may be configured to perform XML parsing or other related functions. For example, MPM 102 may receive XML formatted data, e.g., an XML file or a message containing a XML formatted payload. In this example, MPM 102 may parse the XML formatted data by storing XML tags and other relevant information in multi-view data structure 400 and/or other data structures. Continuing with this example, MPM 102 may use or access data in multi-view data structure 400 for processing XML formatted data and/or for performing other functions.

In some embodiments, MPM 102 or related functionality therein may be configured to iterate through entries of at least one linked list data structure and perform various actions depending on information stored in the at least one linked list data structure. For example, where lazy or need-based decoding is performed, MPM 102 or related functionality may inspect or analyze end and start offsets associated with TLV elements in ingress message 106, such that appropriate non-decoded TLV elements may be inserted from ingress message 106 into egress message 108 prior to copying a decoded or added TLV element from one of linked lists 300-304 into egress message 108.

In some embodiments, MPM 102 may be located at PN 100, e.g., a computing platform, a signaling router, a routing agent, a relay agent, a forwarding agent, a DSR, a Diameter node, a RADIUS node, a RADIUS signaling router, a network router, a network switch, or a network device. In some embodiments, PN 100 may be implemented at or by a virtualized node, e.g., a virtualized DSR or other virtualized signaling router executing using one or more processors or computing platforms.

It should be noted that PN 100, MPM 102, and/or functionality described herein may constitute a special purpose computing device. Further, PN 100, MPM 102, and/or functionality described herein can improve the technological field of processing messages containing TLV elements, including techniques for decoding and/or encoding TLV elements.

The subject matter described herein for processing messages containing TLV elements improves the functionality of message processor and related nodes by providing for more efficient resource (e.g., memory) utilization and improved processing speeds. It should also be noted that a computing platform that implements the subject matter described herein may comprise a special purpose computing device usable to encode and/or decode TLV elements and may utilize a multi-view data structure.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for processing a message containing type-length-value (TLV) elements, the method comprising:
   receiving an ingress message containing a plurality of TLV elements;
   decoding a TLV element from the plurality of TLV elements;
   generating a TLV instance data element containing information about the TLV element, wherein the TLV instance data element includes a value associated with the TLV element, a length associated with the TLV element, and information for indicating a location of the TLV element in the ingress message;
   storing the TLV instance data element containing the information about the TLV element in a multi-view data structure implemented using a memory, wherein the multi-view data structure includes an associative container storing a plurality of TLV instance containers, wherein each of the plurality of TLV instance containers is a data structure storing TLV instance data elements of a same TLV element type, wherein each of the plurality of TLV instance containers is indexed using a tag based on their respective TLV element type, wherein storing the TLV instance data element in the multi-view data structure includes modifying the associative container by storing the TLV instance data element in a first TLV instance container associated with a first TLV element type corresponding to the TLV instance data element, and modifying one or more entries of at least one linked list data structure, wherein the at least one linked list data structure includes a linked list data structure for ordering TLV instance data elements decoded from the ingress message, a linked list data structure for ordering TLV elements that are to be included near an egress message header, a linked list data structure for ordering TLV elements that are to be included near the end of an egress message, a linked list data structure for ordering decoded TLV elements, or a linked list data structure for ordering TLV elements that are to be included between decoded TLV elements in an egress message, wherein the at least one linked data structure includes entries that point to data stored in more than one of the plurality of TLV instance containers; and
   performing a message processing operation using the information about the TLV element stored in the multi-view data structure.

2. The method of claim 1 wherein the ingress message includes a Diameter message, a remote authentication dial in user service (RADIUS) message, a common open policy service (COPS) message, a link layer discovery protocol (LLDP) message, or an intermediate system to intermediate system (IS-IS) message.

3. The method of claim 1 wherein receiving the ingress message, decoding the TLV element, or storing an entry containing information about the TLV element in a multi-view data structure occurs at a processing node, a computing platform, a signaling router, a routing agent, a relay agent, a forwarding agent, a Diameter signaling router (DSR), a Diameter node, a remote authentication dial in user service (RADIUS) node, a RADIUS signaling router, a network router, a network switch, a virtualized node, a virtualized DSR, a virtualized signaling router, or a network device.

4. The method of claim 1 wherein the first TLV instance container stores entries in an order based on a relative position of each TLV element in the ingress message.

5. The method of claim 1 wherein the at least one linked list data structure orders entries based on a position of the TLV element in the ingress message with regard to positions of other TLV elements in the ingress message.

6. The method of claim 1 comprising:
   encoding, using the multi-view data structure, an egress message; and
   sending the egress message to a destination.

7. The method of claim 1 wherein the multi-view data structure is utilized in extensible markup language (XML) parsing or XML related processing.

8. A system for processing a message containing type-length-value (TLV) elements, the system comprising:
   at least one processor;
   a memory; and
   a message processing module (MPM) implemented using the at least one processor, wherein the MPM is configured to receive an ingress message containing a plurality of TLV elements, to decode a TLV element from the plurality of TLV elements, to generate a TLV instance data element containing information about the decoded TLV element, wherein the TLV instance data element includes a value associated with the TLV element, a length associated with the TLV element, and information for indicating a location of the TLV element in the ingress message, to store the TLV instance data element containing the information about the TLV element in a multi-view data structure implemented using a memory, wherein the multi-view data structure includes an associative container storing a plurality of TLV instance containers, wherein each of the plurality of TLV instance containers is a data structure storing TLV instance data elements of a same TLV element type, wherein each of the plurality of TLV instance containers is indexed using a tag based on their respective TLV element type, wherein storing the TLV instance data element in the multi-view data structure includes modifying the associative container by storing the TLV instance data element in a first TLV instance container associated with a first TLV element type corresponding to the TLV instance data element, and modifying one or more entries of at least one linked list data structure, wherein the at least one linked list data structure includes a linked list data structure for ordering TLV instance data elements decoded from the ingress message, a linked list data structure for ordering TLV elements that are to be included near an egress message header, a linked list data structure for ordering TLV elements that are to be included near the end of an egress message, a linked list data structure for ordering decoded TLV elements, or a linked list data structure for ordering TLV elements that are to be included between decoded TLV elements in an egress message, wherein the at least one linked data structure includes entries that point to data stored in more than one of the plurality of TLV instance containers, and to perform a message processing operation using the information about the TLV element stored in the multi-view data structure.

9. The system of claim 8 wherein the ingress message includes a Diameter message, a remote authentication dial in user service (RADIUS) message, a common open policy service (COPS) message, a link layer discovery protocol (LLDP) message, or an intermediate system to intermediate system (IS-IS) message.

10. The system of claim 8 wherein the MPM is located at a processing node, a computing platform, a signaling router, a routing agent, a relay agent, a forwarding agent, a Diameter signaling router (DSR), a Diameter node, a remote authentication dial in user service (RADIUS) node, a RADIUS signaling router, a network router, a network switch, a virtualized node, a virtualized DSR, a virtualized signaling router, or a network device.

11. The system of claim 8 wherein the first TLV instance container stores entries in an order based on a relative position of each TLV element in the ingress message.

12. The system of claim 8 wherein the at least one linked list data structure stores information in an order based on a position of the TLV element in the ingress message with regard to positions of other TLV elements in the ingress message.

13. The system of claim 8 wherein the MPM is configured to encode, using the multi-view data structure, an egress message and to send the egress message to a destination.

14. The system of claim 8 wherein the MPM is configured to utilize the multi-view data structure for extensible markup language (XML) parsing or XML related processing.

15. A non-transitory computer readable medium comprising computer executable instructions embodied in the non-transitory computer readable medium that when executed by a processor of a computer control the computer to perform steps comprising:

receiving an ingress message containing a plurality of TLV elements;

decoding a TLV element from the plurality of TLV elements;

generating a TLV instance data element containing information about the decoded TLV element, wherein the TLV instance data element includes a value associated with the TLV element, a length associated with the TLV element, and information for indicating a location of the TLV element in the ingress message;

storing the TLV instance data element containing the information about the TLV element in a multi-view data structure implemented using a memory, wherein the multi-view data structure includes an associative container storing a plurality of TLV instance containers, wherein each of the plurality of TLV instance containers is a data structure storing TLV instance data elements of a same TLV element type, wherein each of the plurality of TLV instance containers is indexed using a tag based on their respective TLV element type, wherein storing the TLV instance data element in the multi-view data structure includes modifying the associative container by storing the TLV instance data element in a first TLV instance container associated with a first TLV element type corresponding to the TLV instance data element, and modifying one or more entries of at least one linked list data structure, wherein the at least one linked list data structure includes a linked list data structure for ordering TLV instance data elements decoded from the ingress message, a linked list data structure for ordering TLV elements that are to be included near an egress message header, a linked list data structure for ordering TLV elements that are to be included near the end of an egress message, a linked list data structure for ordering decoded TLV elements, or a linked list data structure for ordering TLV elements that are to be included between decoded TLV elements in an egress message, wherein the at least one linked data structure includes entries that point to data stored in more than one of the plurality of TLV instance containers; and performing a message processing operation using the information about the TLV element stored in the multi-view data structure.

16. The non-transitory computer readable medium of claim 15 wherein the ingress message includes a Diameter message, a remote authentication dial in user service (RADIUS) message, a common open policy service (COPS) message, a link layer discovery protocol (LLDP) message, or an intermediate system to intermediate system (IS-IS) message.

* * * * *

UNITED STATES PATENT AND TRADEMARK OFFICE
CERTIFICATE OF CORRECTION

PATENT NO. : 10,289,384 B2  
APPLICATION NO. : 14/485147  
DATED : May 14, 2019  
INVENTOR(S) : Zaidi et al.

Page 1 of 1

It is certified that error appears in the above-identified patent and that said Letters Patent is hereby corrected as shown below:

On the Title Page

On page 2, Column 1, item (56), under Other Publications, Line 1, delete "1-8" and insert -- 1-18 --, therefor.

Signed and Sealed this
Twenty-eighth Day of July, 2020

Andrei Iancu
*Director of the United States Patent and Trademark Office*